(12) United States Patent
Goering

(10) Patent No.: US 7,805,915 B2
(45) Date of Patent: Oct. 5, 2010

(54) OFFSET SPINDLE COTTON PICKER BAR

(75) Inventor: Kevin Jacob Goering, Cambridge, IA (US)

(73) Assignee: Deere & Company, Moline, IL (US)

( * ) Notice: Subject to any disclaimer, the term of this patent is extended or adjusted under 35 U.S.C. 154(b) by 84 days.

(21) Appl. No.: 12/241,748

(22) Filed: Sep. 30, 2008

(65) Prior Publication Data

US 2010/0077714 A1    Apr. 1, 2010

(51) Int. Cl.
*A01D 46/14* (2006.01)

(52) U.S. Cl. .............................................. 56/36; 56/50

(58) Field of Classification Search ..................... 56/28, 56/36, 37, 40, 41, 48, 50
See application file for complete search history.

(56) References Cited

U.S. PATENT DOCUMENTS

| | | | | |
|---|---|---|---|---|
| 587,201 A | * | 7/1897 | Haring | ........................... 56/44 |
| 1,054,113 A | * | 2/1913 | Haring | ........................... 56/44 |
| 1,578,224 A | * | 3/1926 | West | ........................... 56/12.5 |
| 1,747,566 A | * | 2/1930 | Newton | ........................ 56/11.2 |
| 7,650,735 B2 | * | 1/2010 | Fox et al. | ........................ 56/36 |
| 2006/0179808 A1 | | 8/2006 | Fox et al. | |

\* cited by examiner

*Primary Examiner*—Alicia M Torres

(57) ABSTRACT

A picker spindle bar includes spindles oriented on the bar to offset the spindle picking ends relative to each other. In an exemplary embodiment, adjacent spindle axes are rotated six degrees relative to each other about the upright spindle drive shaft axis so that the picking ends of adjacent spindles are offset and enter the doffing zone at different times to reduce peak loads on the harvester row unit. The angled spindle configurations also space picking ends fore-and-aft in the picking zone and improve harvesting efficiency, especially where green bolls are present. The staggered spindle ends reduces cotton pinching in the picking, doffing and spindle wiping areas to thereby reduce row unit plugging.

15 Claims, 3 Drawing Sheets

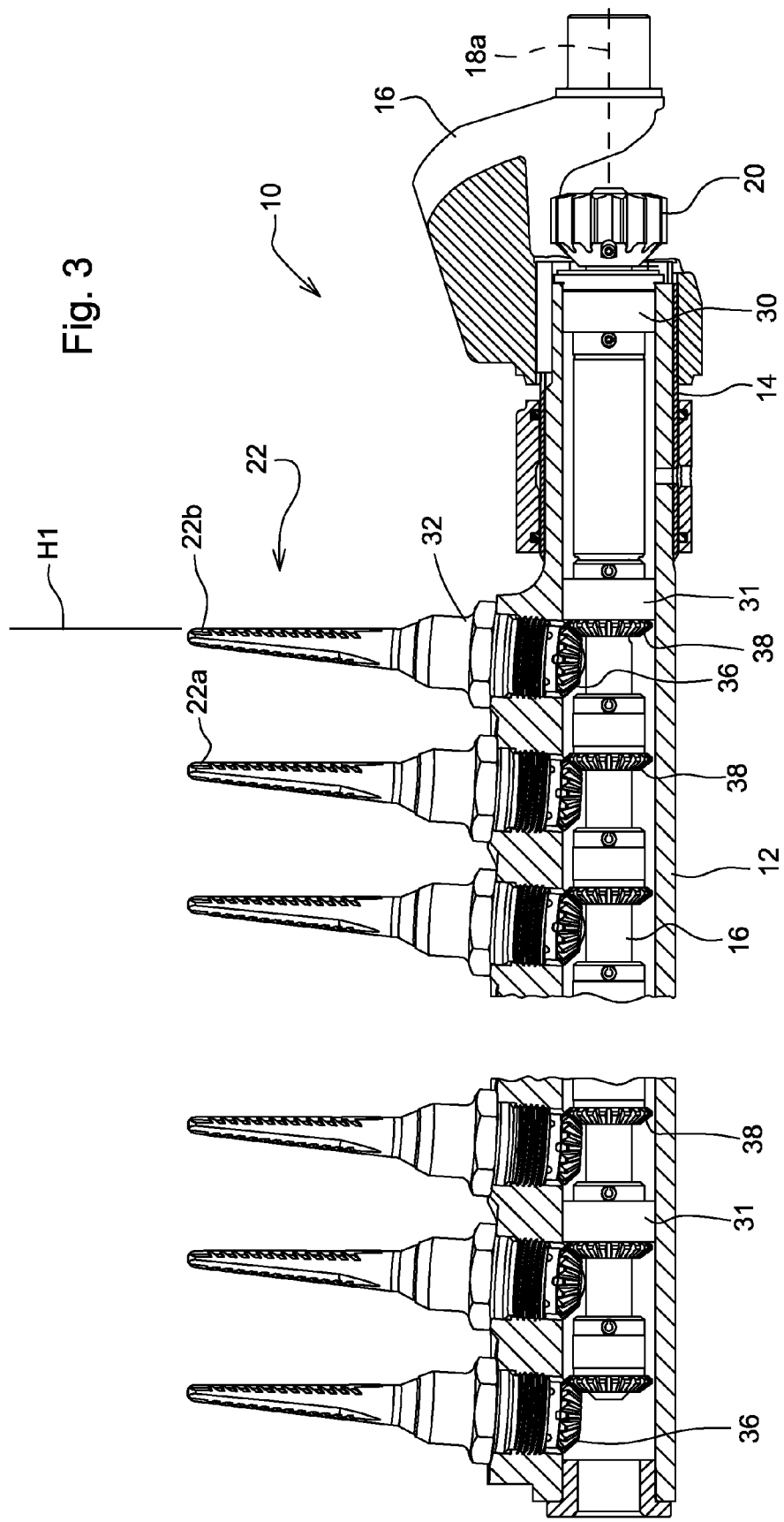

OFFSET SPINDLE COTTON PICKER BAR

FIELD OF THE INVENTION

The present invention relates to spindle type cotton harvesters and, more specifically, to a picker bar for such a harvester.

BACKGROUND OF THE INVENTION

Cotton harvesters typically include a row unit structure with picker drums rotatable about upright axes adjacent a row-receiving area of the unit. The drum includes a plurality of upright picker bars having spindles which rotate in contact with cotton plants to remove the cotton. The spindles are aligned vertically in columns, and corresponding spindles on the bars define generally horizontal spindle planes, with a typical drum having eighteen to twenty spindle planes.

Doffers rotate between the spindle planes in contact with the spindles to doff cotton wound on the spindles and direct the cotton towards air door structure for removal from the unit towards a basket or processor. All the spindles on a spindle bar enter the doffing zone at the same time and cause a power requirement spike at the time of entry. In addition, all the cotton is doffed at the same time from the spindles of a bar, and the air system has to be able to handle the peak flow of cotton from all the spindles of a bar. An excess amount of cotton can get pinched between the aligned spindles and the doffer and cause plugging. Similarly, the cotton can also plug between the spindles and the moistener column.

A conventional picker bar includes a single row of spindles spaced uniformly in the vertical direction. Each spindle includes a gear end engaged by a mating bevel gear located on an upright spindle drive shaft supported for rotation within a hollow portion of the bar. The spacing between the spindle planes and thus the density of the spindles on the picker bar is limited by the spindle support and spindle drive arrangement. Currently available drive shaft bevel gear and the spindle nut mounting arrangements prevent closer spacing of spindles. Therefore, increasing the spindle density for increased drum productivity while maintaining the reliability of the spindle, spindle bar and spindle drive has been a continuing source of difficulty. In copending and commonly assigned U.S. application Ser. No. 11/058,150 entitled HIGH DENSITY COTTON PICKER BAR AND SPINDLE ASSEMBLY THEREFOR, filed Feb. 15, 2005, now U.S. Pat. No. 7,650,735, a picker bar is shown and described wherein spindles are non-aligned in the vertical direction to define two or more offset sets of spindles on the bar and facilitate closer vertical spacing of the spindles. Such a spindle bar with increased spindle density has been shown to improve picking efficiency but requires a complex and relatively expensive non-conventional spindle drive.

SUMMARY OF THE INVENTION

It is therefore an object of the present invention to provide a picker spindle bar with improved picking efficiency compared to conventional spindle bars with inline spindles. It is another object to provide such a spindle bar but which is economical to manufacture and does not require nonconventional complex spindle drives or nonconventional moistener pad and doffer columns.

It is another object of the present invention to provide an improved picker spindle bar which, compared to conventional spindle bars, improves picking efficiency, provides smoother row unit operation, reduces plugging and provides a more uniform flow of cotton from the spindles into the conveying system. It is a further object to provide such a spindle bar which improves picking efficiency compared to a conventional spindle bar with the same number of spindles.

A picker spindle bar includes spindles angled relative to each other so the picking ends on a single bar are offset in the direction of picker drum rotation. In an exemplary embodiment, adjacent spindles are angled about the drive shaft axis with the spindle axes intersecting the drive shaft axis. The axes of adjacent spindles are angled about six degrees relative to each other, and the tips of the adjacent spindles are offset on the order of one-half inch (1.27 cm) in the direction of picker drum rotation. The spindle pattern facilitates spacing of the spindles over a range of spacings from 1.625 (4.13 cm) inch to approximately 1.375 inches (3.5 cm).

Because the spindles are offset angularly about the drive shaft axis and have rotational axes intersecting the drive shaft, a single common drive shaft can be employed and expensive nonconventional drive arrangements can be avoided. By angling the spindles and offsetting the spindle ends, only a fraction of the spindles of a bar initially enter the doffing zone, and the remaining spindles enter shortly thereafter to spread the peak load into two smaller peaks. The magnitude of the doffer and drum peak load spikes are therefore significantly reduced compared to a spindle bar with aligned spindles. The air system loading is also more even since all the cotton from the column of spindles is not entering the air stream at the exact same moment. The row unit and air system run more uniformly with less peak load spiking and plugging compared to row units with conventional aligned spindles.

The angled spindles also improve picking efficiency in the cotton plant and reduce plugging as a result of the spindle picking end offset. The alternating spindle offset spaces adjacent spindle picking ends fore-and-aft in the plant to more effectively engage the cotton bolls, especially tight immature bolls. The offset also opens the area between spindles for reduced cotton pinching and causes a portion of the spindles to make doffer and moistener pad contact before the remaining portion of the spindles to afford the cotton better opportunity to move into the doffing and cleaning zones without plugging.

The same or similar manufacture equipment used to manufacture the previously available spindle bars can also be used to manufacture the improved spindle bars. Picking efficiency and smoother row unit operation can be achieved without increasing the number of spindles on each picker bar and without need for special drives or spindle mounting assemblies, thereby minimizing the complexity and cost of the bar.

These and other objects, features and advantages of the present invention will be come apparent upon reading the following detailed description in view of the drawings.

BRIEF DESCRIPTION OF THE DRAWINGS

FIG. 3 a plan view, partially in section, showing a portion of the picker bar of FIG. 1.

DESCRIPTION OF THE PREFERRED EMBODIMENT

Figure 1:
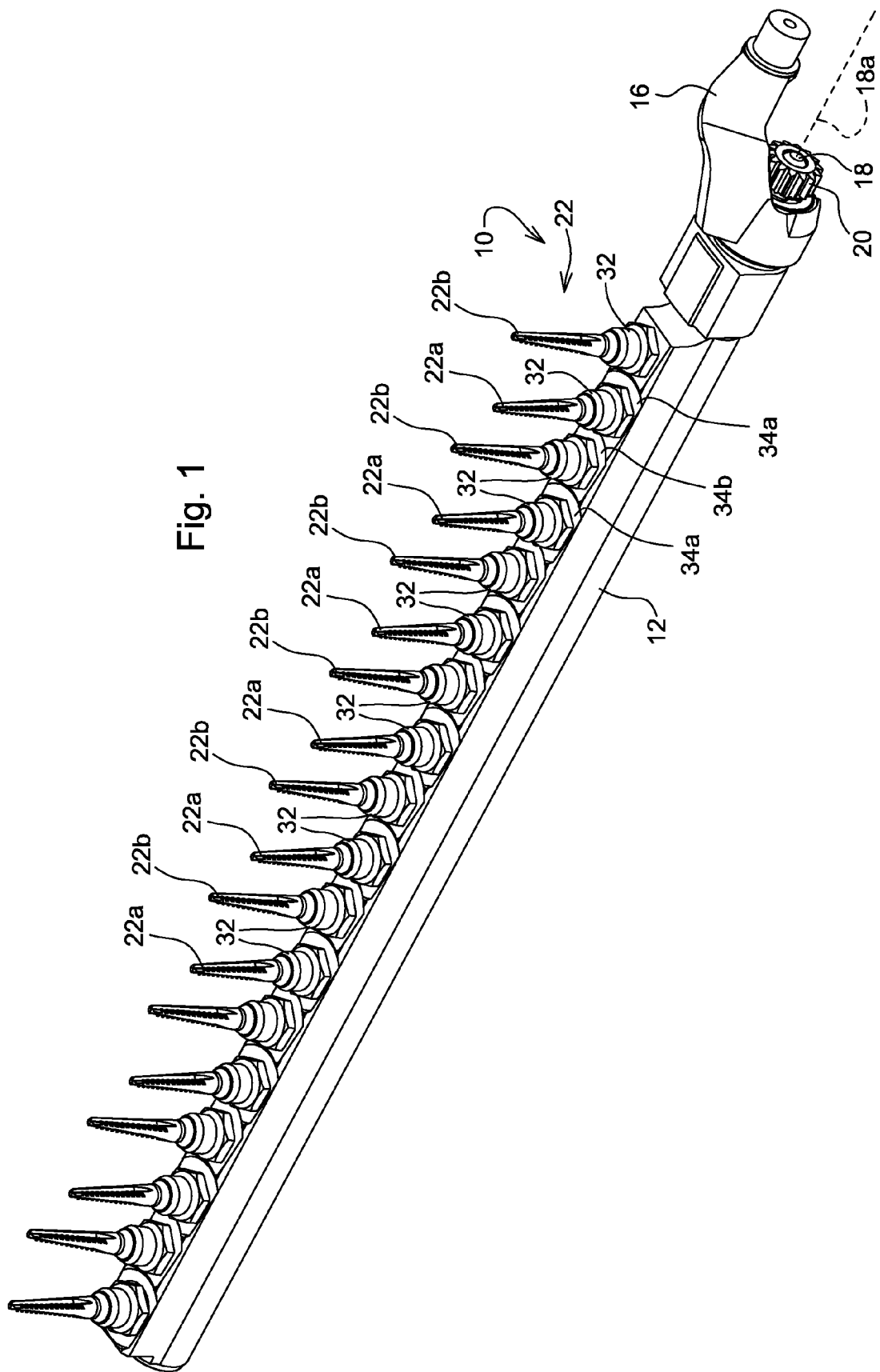
FIG. 1 is a perspective view of a cotton picker bar with angularly offset spindles.
Figure 2:
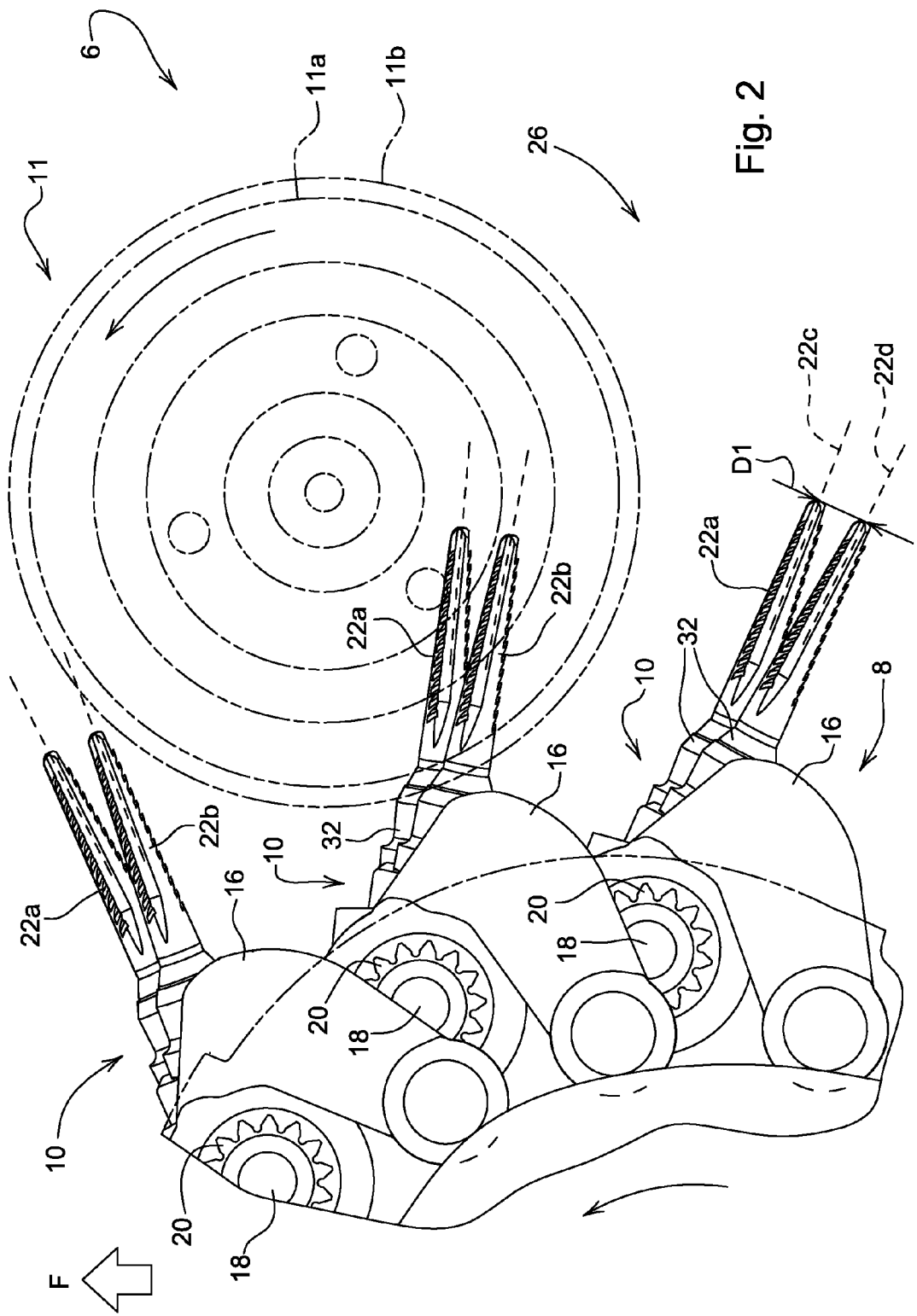
FIG. 2 is a top view of a portion of a cotton picker row unit including the picker bar of FIG. 1 shown adjacent the doffer column.

Referring to FIGS. 1 and 2, therein is shown a portion of a cotton picker row unit 6 having a picker spindle drum 8 with picker spindle bar assemblies 10 adapted for forward movement (F) through rows of cotton plants. A doffer assembly 11 with doffer pads 11a and 11b (FIG. 2) is supported in the row unit adjacent the path of the picker bar assemblies 10. Each picker bar assembly 10 includes a hollow picker bar 12 with an upper end 14 adapted for journaling in the row unit drum head and receiving a cast cam follower arm 16. A spindle drive shaft 18 is rotatably mounted in the hollow picker bar 12 for rotation about an upright axis 18a. A driven gear 20 is fixed to the upper end of the shaft 18 for meshing with a conventional drive gear such as sun gear (not shown).

The picker bar assembly 10 includes two nonaligned sets 22a and 22b of tapered spindles 22 having axes of rotation 22c and 22d, respectively, slightly inclined to the horizontal so that the planes of the tops of the spindles are horizontal (H1 of FIG. 2). As shown, axes 22c and 22d of corresponding spindles 22a and 22b are angled relative to each other about the drive shaft axis 18a. The axes 22c and 22d of the spindles 22a and 22b intersect the drive shaft 18 generally at the shaft axis 18a. The angular offset of the spindles 22 about the shaft axis 18a spaces adjacent spindle ends apart in the direction of drum rotation (arrow of FIG. 2) so that the picking ends enter the plant slightly offset in the fore-and-aft direction. The picking ends will also enter the spindle cleaning area of the moistener pad column (not shown) in the same offset orientation. As seen in FIG. 2, the leading spindles 22a will enter the doffing zone defined by the periphery of the doffers 11a slightly ahead of the spindles 22b so that the cotton will be unwrapped from the leading spindles 22a before being unwrapped from the trailing spindles 22b by the doffers 11b. The cotton from the leading spindles 22a will also enter the cotton conveying area indicated generally at 26 in FIG. 2 slightly before the cotton from the spindles 22b enters the area 26.

Vertically spaced bearings 30 and 31 rotatably support the drive shaft 16 within the hollow interior of the spindle bar 12. Conventional spindle nut assemblies 32 support the spindles 22 in apertured flats 34a and 34b on one side of the spindle bar 12. The planes of the flats 34a and 34b are generally vertical, and the flats 34a are angled relative to the flats 34b. The apertures are threaded to receive and support the spindles 22a and 22b with spindle drive end bevel gears 36 meshing with mating bevel gears 38 pinned to the drive shaft 16. As the drive shaft 18 is rotated about the axis 18a, the shaft bevel gears 38 drive the spindle bevel gears 36 and rotate the spindles 22 about the axes 22a and 22b which intersect the shaft axis 18a. By angling the spindle axes 22a relative to the axes 22b in this manner, spindle end offset is achieved using a conventional bevel gear arrangement without need for two drive shafts or special spindle drives.

By way of example only without limitation, providing a relative angle of 6 degrees between the flats 34a and 34b and thus between the axes 22a and 22b, a spindle tip offset (D1 of FIG. 2) of approximately 0.5 inch (1.27 cm) results. Vertical spindle spacing is approximately 1.625 inches (4.13 cm), although the above-described spindle bar configuration accommodates narrow spacings such as 1.375 inches (3.5 cm) or less for more dense spindle configurations. Spindle drive shaft bevel gear length and drive shaft bearing width are decreased and the number of drive shaft bearings 31 is increased, compared to a conventional inline picker bar, to accommodate the narrower spindle spacing while maintaining bearing capacity for the denser configurations.

As shown, the second set of spindles 22b are uniformly interleaved between the first set of spindles 22a, and the vertical spacing between adjacent spindles is generally constant along the picker bar 12. However, other spacing configurations, spindle patterns and spindle axes orientations could also be utilized. For example, spindles could be oriented on the picker bar in patterns of spindles angled at −x degrees, 0 degrees and +x degrees relative to the drive shaft axis to divide peak loads by 3 instead of two.

The doffer column 11 includes doffer pads 11a and 11b of different diameters. The doffer pads 11a that doff cotton from the leading spindles 22a are smaller in diameter than the doffer pads 11b that doff cotton from the lagging spindles 22b. Since the spindles 22a on the bar 12 are offset angularly about the axis 18a, the relation of the spindle to the doffer varies from one spindle of the pair to the other. By providing doffers of differing diameter, the angular relation between the spindles 22 being doffed and the rotating doffer pads 11a and 11b are optimized for both the leading spindles 22a and the trailing spindles 22b in the doffing zone. The smaller diameter of the doffer pads 11a prevents interference between the pads and the spindle nut assemblies 32 for the spindles 22a. The larger diameter of the doffer pads 11b completely doffs the lagging spindles 22b and avoids leaving a small ring of undoffed cotton near the nut assemblies 32. As can be appreciated from FIG. 2, the radially outermost portions of the doffers 11a and 11b are in generally identical positions relative to the spindle nut assemblies for the respective spindles 22a and 22b.

Having described the preferred embodiment, it will become apparent that various modifications can be made without departing from the scope of the invention as defined in the accompanying claims.

The invention claimed is:

1. A cotton picker spindle bar assembly including an upright spindle bar, the spindle bar supporting a plurality of vertically spaced spindles having spindle ends and gear ends, the spindle ends adapted to enter cotton plants to remove cotton therefrom, each of the spindles rotatable about a spindle axis, a drive shaft supported by the bar for rotation about an upright drive shaft axis in driving relationship with the gear ends, wherein the spindle axes of adjacent spindles are angled relative to each other about the drive shaft axis to offset the spindle ends so adjacent spindle ends are nonaligned in a vertical direction, and wherein the spindles are supported in at least two sets of spindles, the first set of spindles having spindle axes offset at an angle about the drive shaft axis relative to the axes of the second set of spindles, wherein the axes of the first set of spindles are offset at an angle about the drive shaft axis of approximately 6 degrees relative to the axes of the second set of spindles.

2. The spindle bar assembly as set forth in claim 1 wherein the gear ends are generally centered relative to the drive shaft.

3. The spindle bar assembly as set forth in claim 1 wherein the spindle ends of the first set of spindles are offset approximately one-half inch (1.27 cm) in a fore-and-aft direction from the spindle ends of the second set of spindles.

4. The spindle bar assembly as set forth in claim 1 wherein the second set of spindles are uniformly interleaved between the first set of spindles and the vertical spacing between adjacent spindles is generally constant along the picker bar.

5. The spindle bar assembly as set forth in claim 1 wherein the spindles are spaced apart a distance in the range of 1.375 inch (3.5 cm) to 1.625 inch (4.13 cm).

6. The spindle bar assembly as set forth in claim 1 wherein the drive shaft comprises bevel gears meshing with the gear ends, and bearings secured by removable pin structure on opposite sides of the bevel gears rotatably supporting the drive shaft within the picker bar.

7. The spindle assembly as set forth in claim 1 wherein the spindle axes generally intersect the drive shaft axis.

8. A cotton picker spindle bar assembly including an upright spindle bar, the spindle bar supporting a plurality of vertically spaced spindles having spindle ends and gear ends, the spindle ends adapted to enter cotton plants to remove cotton therefrom, each of the spindles rotatable about a spindle axis, a drive shaft supported by the bar for rotation about an upright drive shaft axis in driving relationship with the gear ends, wherein the spindle axes of adjacent spindles are angled relative to each other about the drive shaft axis to offset the spindle ends so adjacent spindle ends are non-aligned in a vertical direction, wherein the spindle axes generally intersect the drive shaft axis, and wherein the spindle axes of adjacent spindles are angularly offset from each other approximately 6 degrees about the axis of the drive shaft.

9. A cotton picker spindle bar assembly for a cotton harvester row unit including a vertical doffing zone with a driven doffer for removing cotton from the spindle bar assembly, the spindle bar assembly including an upright spindle bar, the spindle bar supporting a plurality of vertically spaced spindles having spindle ends and gear ends, the spindle ends adapted to enter cotton plants to remove cotton therefrom, each of the spindles rotatable about a spindle axis, a drive shaft supported by the bar for rotation about an upright drive shaft axis in driving relationship with the gear ends, wherein the spindle axes of the spindles are angled relative to each other to offset the picking ends so adjacent spindle ends enter the doffing zone at different times to reduce peak drive loading on the driven doffer, and wherein the spindles are supported in at least two sets of spindles, the first set of spindles having spindle axes offset at an angle about the drive shaft axis relative to the axes of the second set of spindles and the axes of the first set of spindles are offset at an angle about the drive shaft axis of approximately 6 degrees relative to the axes of the second set of spindles.

10. The spindle bar assembly as set forth in claim 9 wherein the gear ends are generally centered relative to the drive shaft.

11. The spindle bar assembly as set forth in claim 9 wherein the spindle ends of the first set of spindles are offset approximately one-half inch (1.27 cm) in a fore-and-aft direction from the spindle ends of the second set of spindles.

12. The spindle bar assembly as set forth in claim 9 wherein the second set of spindles are uniformly interleaved between the first set of spindles and the vertical spacing between adjacent spindles is generally constant along the picker bar.

13. The spindle bar assembly as set forth in claim 9 wherein the spindles are vertically spaced apart a distance, the distance being in the range of 1.375 inches (3.5 cm) to 1.625 inches (4.13 cm).

14. The spindle bar assembly as set forth in claim 9 wherein the spindle bar includes apertured upright flats receiving spindle support assemblies, the flats being angled relative to each other so the support assemblies support the spindles with the axes offset relative to each other.

15. The spindle assembly as set forth in claim 9 wherein drive shaft comprises bevel gears meshing with the gear ends, the bevel gears uniformly spaced along the drive shaft, wherein the spindle axes generally intersect the drive shaft axis, and wherein the spindle axes of adjacent spindles are angularly offset from each other about the axis of the drive shaft.

* * * * *